(12) United States Patent
Fujishiro et al.

(10) Patent No.: US 9,894,551 B2
(45) Date of Patent: Feb. 13, 2018

(54) BASE STATION AND USER TERMINAL FOR PERFORMING MEASUREMENT AND COMMUNICATION IN UNLICENSED FREQUENCY BANDS

(71) Applicant: KYOCERA CORPORATION, Kyoto (JP)

(72) Inventors: Masato Fujishiro, Yokohama (JP); Chiharu Yamazaki, Tokyo (JP); Yushi Nagasaka, Yokohama (JP); Katsuhiro Mitsui, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/423,705

(22) Filed: Feb. 3, 2017

(65) Prior Publication Data
US 2017/0150387 A1    May 25, 2017

Related U.S. Application Data

(63) Continuation of application No. PCT/JP2015/072184, filed on Aug. 5, 2015.

(30) Foreign Application Priority Data

Aug. 5, 2014   (JP) .................. 2014-159386

(51) Int. Cl.
*H04B 17/00*   (2015.01)
*H04W 24/10*   (2009.01)
*H04W 72/04*   (2009.01)

(52) U.S. Cl.
CPC ............ *H04W 24/10* (2013.01); *H04B 17/00* (2013.01); *H04W 72/0473* (2013.01)

(58) Field of Classification Search
CPC .......................... H04W 24/10; H04W 72/0473
(Continued)

(56) References Cited

U.S. PATENT DOCUMENTS

2015/0050939 A1   2/2015   Futaki et al.
2015/0131536 A1   5/2015   Kaur et al.

FOREIGN PATENT DOCUMENTS

JP    2014-500685 A    1/2014
WO   2010/111150 A2   9/2010
(Continued)

OTHER PUBLICATIONS

International Search Report issued in PCT/JP2015/072184; dated Nov. 2, 2015.
(Continued)

*Primary Examiner* — Nay A Maung
*Assistant Examiner* — Angelica M Perez
(74) *Attorney, Agent, or Firm* — Studebaker & Brackett PC

(57) ABSTRACT

A user terminal according to an embodiment comprises a receiver; and a controller. The receiver receives, from a base station, a message including first and second information. The first information is information regarding to a configuration for reporting a power measured by the user terminal in the unlicensed band, and includes period information indicating a period of a measurement in the unlicensed band. The second information is information regarding to a configuration of carrier aggregation. The controller periodically measures the power in the unlicensed band according to the period information; reports to the base station on information classified according to the measured power as information indicating the measured power, based on the first information; performs a configuration for using the unlicensed band as a secondary carrier in the carrier aggregation, based on the second information; and communicates a communication with the base station by using the secondary carrier.

2 Claims, 12 Drawing Sheets

(58) Field of Classification Search
USPC .................................................. 455/67.11
See application file for complete search history.

(56) References Cited

FOREIGN PATENT DOCUMENTS

| WO | 2012/078565 A1 | 6/2012 | |
|----|----|----|----|
| WO | WO 2012078565 A1 * | 6/2012 | ............. H04L 5/001 |
| WO | 2013/161135 A1 | 10/2013 | |

OTHER PUBLICATIONS

Written Opinion issued in PCT/JP2015/072184; dated Nov. 2, 2015.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.0.0; Dec. 2013; pp. 1-208; Release 12; 3GPP Organizational Partners.
An Office Action; "Notice of Reasons for Rejection," issued by the Japanese Patent Office dated May 23, 2017, which corresponds to Japanese Patent Application No. 2016-540257 and is related to U.S. Appl. No. 15/423,705; with English language statement of relevance.

* cited by examiner

FIG. 6
[LAA]
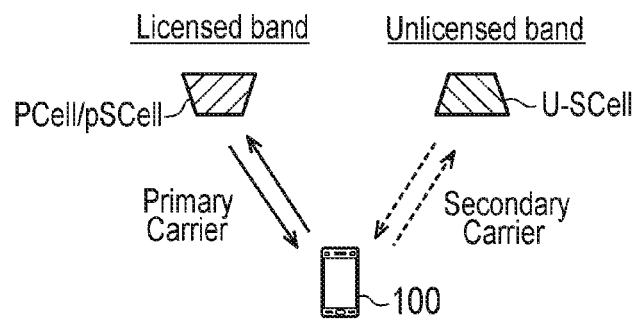
[Standalone with LAA]
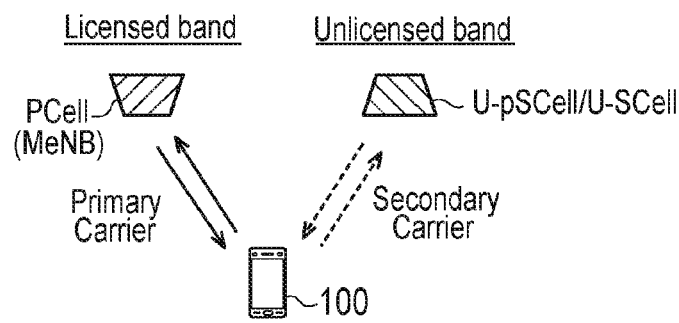
[Standalone]
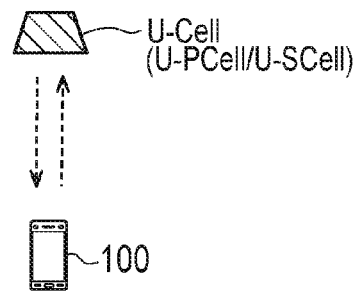

BASE STATION AND USER TERMINAL FOR PERFORMING MEASUREMENT AND COMMUNICATION IN UNLICENSED FREQUENCY BANDS

CROSS-REFERENCE TO RELATED APPLICATION

The present application is a continuation based on PCT Application No. PCT/JP2015/072184 filed on Aug. 5, 2015, which claims the benefit of Japanese Patent Application No. 2014-159386 filed on Aug. 5, 2014, entitled "BASE STATION AND USER TERMINAL," the contents of which are incorporated by reference herein in their entirety.

TECHNICAL FIELD

The present application relates to a user terminal capable of performing communication in a specific frequency band and a base station capable of communicating with the user terminal.

BACKGROUND ART

In 3GPP (3rd Generation Partnership Project), which is a project aiming to standardize a mobile communication system, specifications are being designed to enhance LTE (Long Term Evolution) in order to comply with the rapidly increasing traffic demands (for example, see 3GPP Technical Specification "TS 36.300 V12.0.0" January, 2014).

At the same time, a specific frequency band available without a license (Unlicensed Band/Unlicensed Spectrum) has attracted attention. As a means for responding to a rapidly increasing traffic demand in a mobile communication system, it may be possible to utilize the above-described specific frequency band for the mobile communication.

SUMMARY

A user terminal according to an embodiment is configured to communicate by using an unlicensed band. The user terminal comprises a receiver; and a controller. The receiver is configured to receive, from a base station, a message including first information and second information. The first information is information regarding to a configuration for reporting a power measured by the user terminal in the unlicensed band. The first information includes period information indicating a period of a measurement in the unlicensed band. The second information is information regarding to a configuration of carrier aggregation. The controller is configured to: periodically measure the power in the unlicensed band according to the period information; report to the base station on information classified according to the measured power as information indicating the measured power, on a basis of the first information; perform a configuration for using the unlicensed band as a secondary carrier in the carrier aggregation, on a basis of the second information; and communicate a communication with the base station by using the secondary carrier.

A processor according to an embodiment is a processor for controlling a user terminal configured to communicate by using an unlicensed band. The processor is configured to receive a message including first information and second information. The first information is information regarding to a configuration for reporting a power measured by the user terminal in the unlicensed band. The first information includes period information indicating a period of a measurement in the unlicensed band. The second information is information regarding to a configuration of carrier aggregation. The processor is configured to: periodically measure the power in the unlicensed band according to the period information; report to the base station on information classified according to the measured power as information indicating the measured power, on a basis of the first information; perform a configuration for using the unlicensed band as a secondary carrier in the carrier aggregation, on a basis of the second information; and communicate a communication with the base station by using the secondary carrier.

A base station according to an embodiment comprises: a transmitter; a receiver; and a controller. The transmitter is configured to transmit a message including first information and second information, to a user terminal configured to communicate by using an unlicensed band. The first information is information regarding to a configuration for reporting a power measured by the user terminal in the unlicensed band. The first information includes period information indicating a period of a measurement in the unlicensed band. The second information is information regarding to a configuration of carrier aggregation. The receiver configured to receive, from the user terminal, information classified according to the measured power as information indicating the measured power. The controller configured to perform a communication with the user terminal by using the unlicensed band as a secondary carrier in the carrier aggregation.

A processor according to an embodiment is a processor for controlling a base station. The processor is configured to: transmit, a message including first information and second information, to a user terminal configured to communicate by using an unlicensed band. The first information is information regarding to a configuration for reporting a power measured by the user terminal in the unlicensed band. The first information includes period information indicating a period of a measurement in the unlicensed band. The second information is information regarding to a configuration of carrier aggregation. The processor is configured to: receive, from the user terminal, information classified according to the measured power as information indicating the measured power; and perform a communication with the user terminal by using the unlicensed band as a secondary carrier in the carrier aggregation.

BRIEF DESCRIPTION OF THE DRAWINGS

FIG. 6 is a diagram for describing communication in a specific frequency band according to the embodiment.

DESCRIPTION OF THE EMBODIMENT

[Overview of Embodiment]

Figure 1:
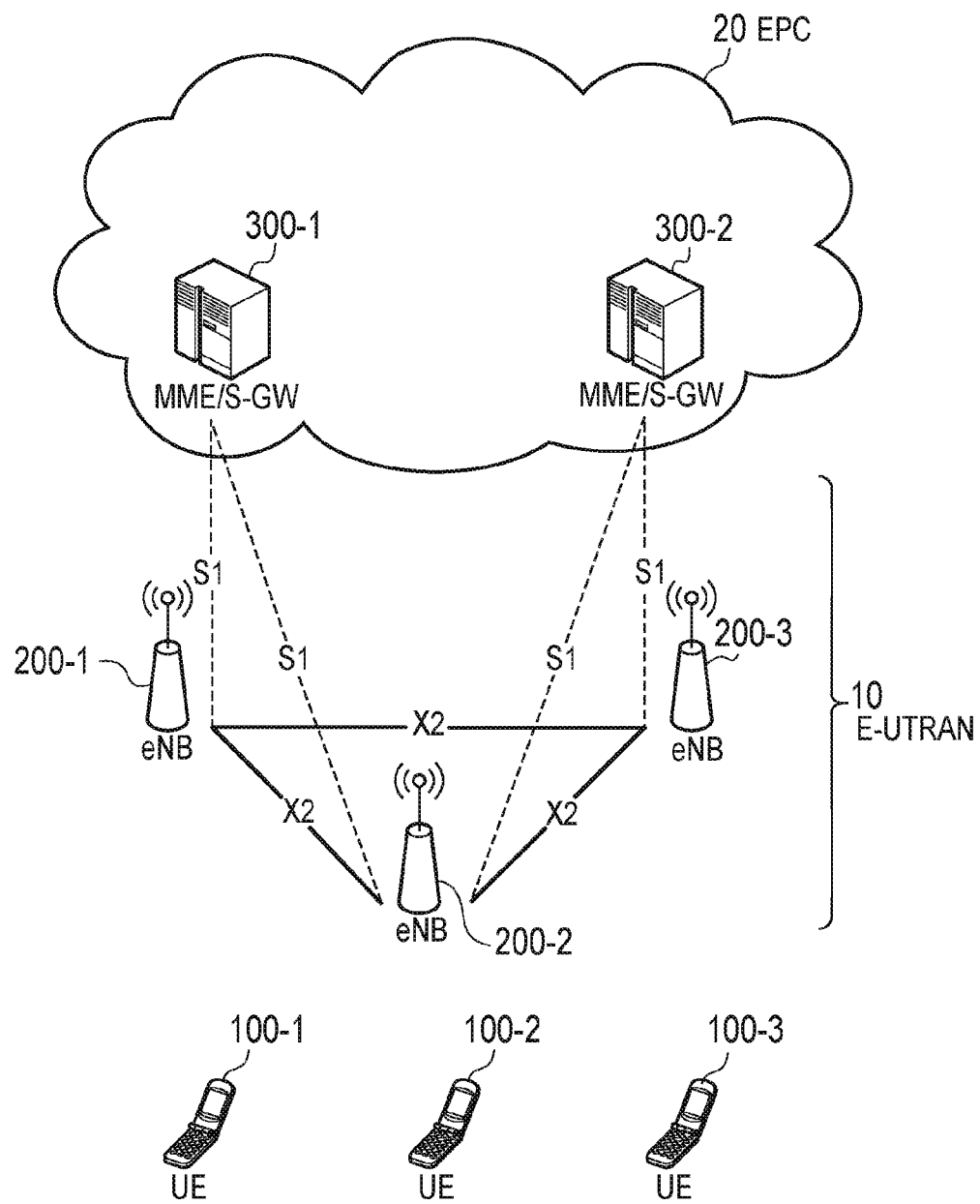
FIG. 1 is a configuration diagram of an LTE system according to an embodiment.

A base station according to a first present embodiment is capable of communication with a user terminal used in a cellular communication system. The base station comprises a controller configured to acquire a first measurement report indicating an interference state, measured by the user terminal, in a specific frequency band that can be utilized without a license, and to allocate, on the basis of the first measurement report, a time-frequency resource in the specific frequency band to the user terminal.

In a first embodiment, the controller utilizes a general frequency band which is a frequency band different from the specific frequency band and in which a license is granted to a cellular network operator, so as to acquire the first measurement report.

In a first embodiment, the controller further acquires a second measurement report indicating an interference state in the specific frequency band measured by a cell of the specific frequency band. The controller allocates, on the basis of the first measurement report and the second measurement report, the time-frequency resource.

The base station according to a first embodiment further comprises: a transmitter configured to transmit configuration information instructing a timing at which the user terminal measures the interference state. The controller allocates the time-frequency resource so that the user terminal does not perform cellular communication at the timing.

A user terminal according to a first embodiment is used in a cellular communication system. The user terminal comprises: a controller configured to perform control to measure an interference state in a specific frequency band that can be utilized without a license. The controller performs control to notify a base station configured to allocate, to the user terminal, a time-frequency resource in the specific frequency band, of a measurement report indicating the interference state.

In a first embodiment, the controller utilizes a general frequency band which is a frequency band different from the specific frequency band and in which a license is granted to a cellular network operator, so as to perform the control to notify the measurement report.

A user terminal according to a first embodiment further comprises a receiver configured to receive configuration information instructing a timing at which the user terminal measures the interference state. The controller performs control to measure the interference state at a timing instructed by the configuration information.

A base station according to a second embodiment is capable of communication with a user terminal used in a cellular communication system. The base station comprises: a controller configured to perform control to stop allocation of a time-frequency resource in a specific frequency band to the user terminal, on the basis of information transmitted from the user terminal if reception quality of the user terminal in the specific frequency band that can be utilized without a license is lower than a threshold value. The information is transmitted by utilizing a general frequency band which is a frequency band different from the specific frequency and in which a license is granted to a cellular network operator.

In a second embodiment, the information is a notification to request a stop of communication in the specific frequency band.

In a second embodiment, the information is a negative acknowledgment indicating that the user terminal has not properly received data by utilizing the specific frequency band. The controller performs control to stop allocation of the time-frequency resource in accordance with a reception state of the negative acknowledgment.

In a second embodiment, the controller performs control, on the basis of the information, to transmit, to another base station configured to perform communication with the user terminal in the specific frequency band, an instruction to stop transmission to the user terminal.

In a second embodiment, the controller performs control, on the basis of the information, to transmit, to the user terminal, a measurement instruction of an interference state in the specific frequency band, by utilizing the general frequency band.

In a second embodiment, the controller acquires, from the user terminal, a request for starting communication in the specific frequency band, and on the basis of the request, performs control to restart the allocation of the time-frequency resource to the user terminal.

A base station according to a second embodiment is capable of communication with a user terminal used in a cellular communication system. The base station comprises: a controller configured to control communication with the user terminal in a specific frequency band that can be used without a license. The controller transmits, if reception quality of the user terminal in the specific frequency band is lower than a threshold value, information indicating that the reception quality of the user terminal is lower than the threshold value, to another base station via a backhaul. The other base station is a base station capable of performing communication with the user terminal by utilizing a general frequency band in which a license is granted to a cellular network operator.

In a second embodiment, the information is used as a trigger for causing the user terminal to measure an interference state in the specific frequency band.

A base station according to a second embodiment is capable of communication with a user terminal used in a cellular communication system. The base station comprises: a controller configured to allocate, to the user terminal, a time-frequency resource in a specific frequency band that can be used without a license. The controller performs control to stop, if reception quality of the user terminal in the specific frequency band is lower than a threshold value, the allocation of the time-frequency resource.

A user terminal according to a second embodiment is used in a cellular communication system. The user terminal comprises: a controller configured to control communication in a specific frequency band that can be used without a license. The controller performs control to notify, if reception quality in the specific frequency band is lower than a threshold value, a base station of predetermined information by utilizing a general frequency band that is a frequency band different from the specific frequency band. The base station is a base station configured to allocate a time-frequency resource in the specific frequency band to the user terminal. The general frequency band is a frequency band in which a license is granted to a cellular network operator.

In a second embodiment, the predetermined information is a negative acknowledgment indicating that it is not possible to have properly received data by utilizing the specific frequency band.

In a second embodiment, the predetermined information is a notification to request a stop of the communication in the specific frequency band.

In a second embodiment, in accordance with the number of times in which it is not possible to have properly received data by utilizing the specific frequency band, the controller performs control to start measurement of an interference state in the specific frequency band.

The user terminal according to a second embodiment comprises: a receiver configured to receive, by utilizing the general frequency band, a measurement instruction, from the base station, for an interference state in the specific frequency band. The controller performs control, on the basis of the measurement instruction, to start measurement of the interference state in the specific frequency band.

In a second embodiment, the controller performs control to transmit, if the communication in the specific frequency band is stopped, a request to start the communication in the specific frequency band, on the basis of a measurement result of the interference state.

It is noted that a "base station" as used in the claims is a concept also including not only a general base station (a so-called eNB) but also an RRH base station (Remote Radio Head).

[First Embodiment]

Hereinafter, the embodiment in a case where a content of the present application is applied to an LTE system will be described.

(System Configuration)

FIG. 1 is a configuration diagram of an LTE system according to an embodiment. As shown in FIG. 1, the LTE system according to the embodiment includes UEs (User Equipments) 100, E-UTRAN (Evolved Universal Terrestrial Radio Access Network) 10, and EPC (Evolved Packet Core) 20.

The UE 100 corresponds to a user terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300. The EPC 20 may include an OAM (Operation and Maintenance).

The MME performs various mobility controls and the like, for the UE 100. The S-GW performs control to transfer user data. The MME/S-GW 300 is connected to the eNB 200 via an S1 interface.

The OAM is a server apparatus managed by an operator and performs maintenance and monitoring of the E-UTRAN 10.

Figure 2:
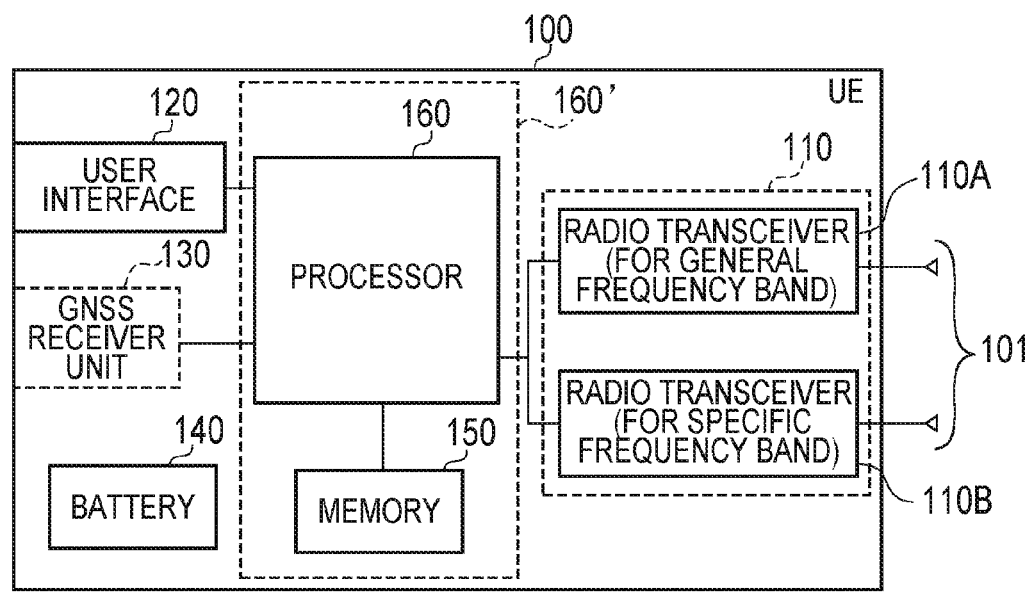
FIG. 2 is a block diagram of a UE according to the embodiment.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The UE 100 may not have the GNSS receiver 130. Furthermore, the memory 150 may be integrally formed with the processor 160, and this set (that is, a chip set) may be a processor 160' constituting the controller.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160.

The radio transceiver 110 comprises a radio transceiver 110A and a radio transceiver 110B. The radio transceiver 110A transmits and receives a radio signal by utilizing the general frequency band, and the radio transceiver 110B transmits and receives a radio signal by utilizing the specific frequency band.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 corresponds to a controller and executes various processes and various communication protocols described later.

Figure 3:
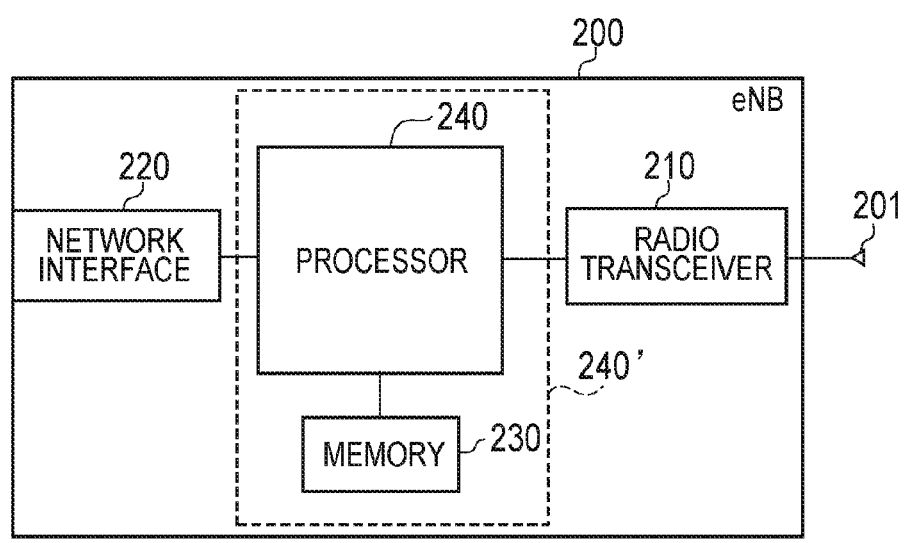
FIG. 3 is a block diagram of an eNB according to the embodiment.

FIG. 3 is a block diagram of the eNB 200. As shown in FIG. 3, the eNB 200 includes a plurality of antennas 201, a radio transceiver 210, a network interface 220, a memory 230, and a processor 240. It is note that the memory 230 may be integrated with the processor 240, and this set (that is, a chipset) may be a processor 240' constituting the controller.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 corresponds to a controller and executes various processes and various communication protocols described later.

Figure 4:
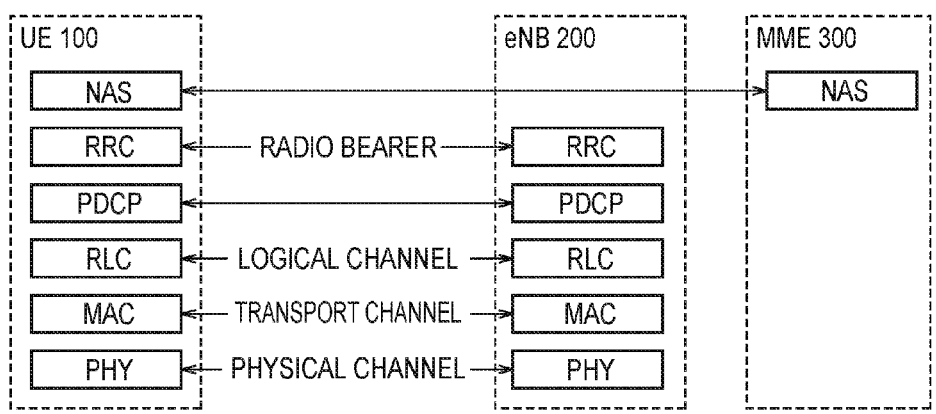
FIG. 4 is a protocol stack diagram according to the embodiment.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a scheduler to decide (schedule) a transport format of an uplink and a downlink (a transport block size, a modulation and coding scheme) and an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and cipher and decipher.

The RRC layer is defined only in a control plane handling a control signal. Between the RRC layer of the UE 100 and the RRC layer of the eNB 200, a control signal (an RRC message) for various types of configuration is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

Figure 5:
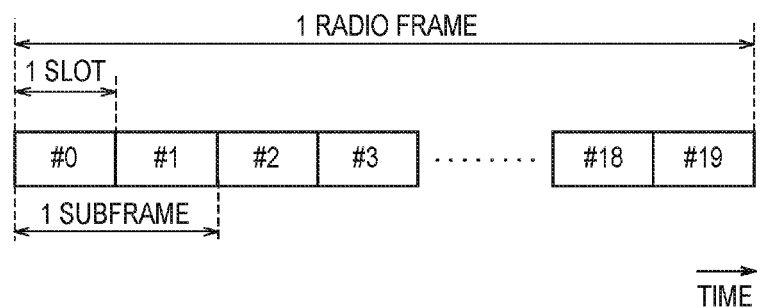
FIG. 5 is a configuration diagram of a radio frame according to the embodiment.

FIG. 5 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(Communication in Specific Frequency Band)

Communication in a specific frequency band according to the present embodiment will be described below with reference to FIG. 6. FIG. 6 is a diagram for describing communication in a specific frequency band according to the present embodiment.

As illustrated in FIG. 6, the UE 100 is capable of performing communication not only in a general frequency band in which a cellular network operator is granted with a license (Licensed band/Licensed spectrum) but also in a specific frequency band available without a license (Unlicensed Band/Unlicensed spectrum).

Specifically, firstly, the UE 100 is capable of performing communication in a specific frequency band by Carrier Aggregation (CA).

In the CA, in order to ensure a backward compatibility with the LTE while realizing an enhanced broadband, a carrier (a frequency band) in the LTE is positioned as a component carrier, and the UE 100 performs communication by simultaneously using a plurality of component carriers (a plurality of serving cells). In the CA, a cell that provides predetermined information when the UE starts the RRC connection is referred to as primary cell (PCell). For example, the primary cell provides NAS mobility information at the time of RRC connection establishment/re-establishment/handover (for example, TAI) and provides security information at the time of RRC connection re-establishment/handover. On the other hand, a supplementary serving cell forming a pair with the primary cell is referred to as a secondary cell (SCell). The secondary cell is formed together with the primary cell.

If using the CA for communication in a specific frequency band, there is a case where the specific frequency band is utilized as the secondary cell. If the specific frequency band is utilized as the secondary cell, the secondary cell is referred to as a U-SCell, below.

Secondly, the UE 100 is capable of performing communication in the specific frequency band by a dual connectivity (DC).

In the DC, the UE 100 is allocated with a radio resource from a plurality of eNBs 200. The DC may be referred to as an inter-eNB carrier aggregation (inter-eNB CA).

In the DC, out of a plurality of eNBs 200 that establish connection with the UE 100, only a master eNB (MeNB) establishes an RRC connection with the UE 100. On the other hand, out of the plurality of eNBs 200, a secondary eNB (SeNB) provides an additional radio resource to the UE 100 without establishing the RRC connection with the UE 100. An Xn interface is set between the MeNB and the SeNB. The Xn interface is either an X2 interface or a new interface.

In the DC, the UE 100 is capable of carrier aggregation in which N cells managed by the MeNB and M cells managed by the SeNB are simultaneously utilized. Further, a group including the N cells managed by the MeNB is called a master cell group (MCG). Moreover, a group including the M cells managed by the SeNB is called a secondary cell group (SCG). Further, out of the cells managed by the SeNB, a cell having a function of receiving at least an uplink control signal (PUCCH) is referred to as a pSCell. The pSCell, which has several functions in much the same way as the PCell, does not perform the RRC connection with the UE 100 and does not transmit the RRC message, either, for example. It is noted that if the specific frequency band is utilized as the Scell, the Scell is referred to as a U-SCell, and if the specific frequency band is utilized as the pSCell, the Scell is referred to as a U-pSCell.

Here, it is assumed that as a mode of communication in the specific frequency band, Licensed-Assisted Access (LAA) is utilized. In the LAA, a general frequency band is used as the primary carrier, and the specific frequency band is used as the secondary carrier. The secondary carrier may be a carrier for downlink and uplink, and may be a carrier dedicated to downlink.

Description proceeds below that (A) is a case where an eNB 200 configured to manage a primary cell (primary carrier) is arranged with a scheduler (scheduling control device) and at least a specific control signal is exchanged by the primary carrier is an LAA case; (B) is a case where an eNB 200 configured to manage a secondary cell (secondary carrier) is arranged with a scheduler and at least a specific control signal is exchanged by a primary carrier is a Standalone with LAA case; and (C) is a case where an eNB 200 configured to manage a secondary cell (secondary carrier) is arranged with a scheduler and a control signal is exchanged by a secondary carrier is a Standalone case (see FIG. 6).

The (A) LAA case includes a case where a specific frequency band is utilized as a secondary cell, in the CA, and a case where a specific frequency band is utilized as a cell managed by an SeNB in the DC. If an eNB configured to manage a primary cell and an eNB configured to manage a secondary cell are the same, the CA is utilized, and if an eNB configured to manage a primary cell and an eNB configured to manage a secondary cell are different, the DC is utilized.

The (B) Standalone with LAA case includes a case where a specific frequency band is utilized as a cell manage by a SeNB in the DC. Specifically, there is a case where the SeNB manages a U-SCell including a U-pSCell and a case where the same manages a U-pSCell (only), for example.

The (C) Standalone case includes a case where a UE 100 performs, without utilizing a general frequency band, communication in a specific frequency band, e.g., a case where a specific frequency band is utilized as a primary cell and a secondary cell in the CA.

Description proceeds that it is assumed where appropriate that an operation by an eNB 200 is an operation by a cell managed by an eNB 200, below.

(Operation According to First Embodiment)

Figure 7:
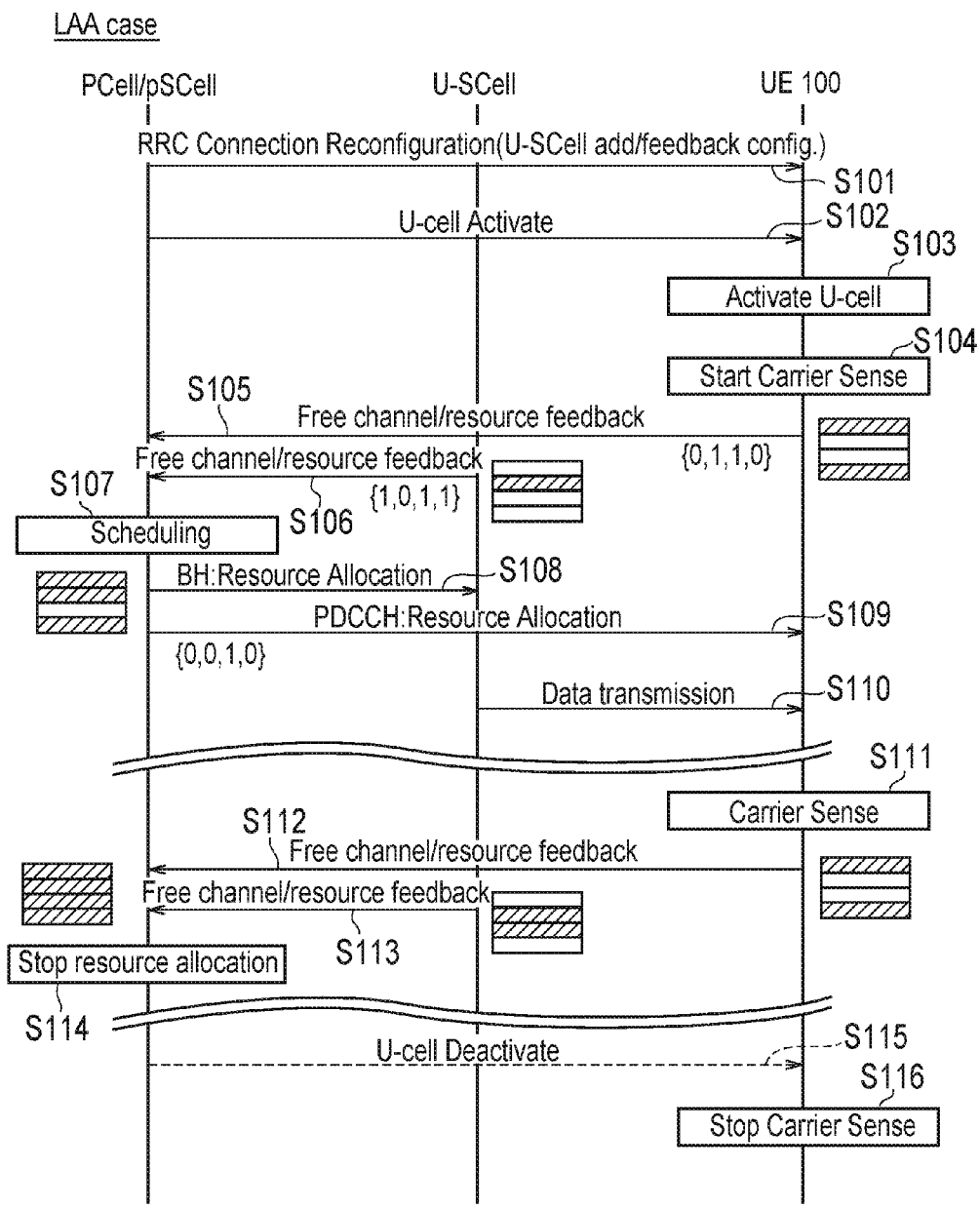
FIG. 7 is a sequence diagram for describing an operation according to a first embodiment.

An operation according to the first embodiment will be described by using FIG. 7. FIG. 7 is a sequence diagram for describing the operation according to the first embodiment. Here, the LAA case will be described. If the CA is utilized, below, a notification between a PCell and a U-SCell is performed within an eNB 200. On the other hand, if the DC is utilized, a notification between a PCell and a U-SCell and a notification between a PCell and a pSCell are performed via a backhaul (with or without wires) between the eNBs 200.

As illustrated in FIG. 7, in step S101, the Pcell transmits an RRC connection reconfiguration message (RRC Connection Reconfiguration) to the UE 100.

The RRC connection reconfiguration message includes configuration information (U-SCell add/feedback config.) for utilizing the specific frequency band as the secondary carrier and/or for feeding back a measurement result of an interference state in the specific frequency band.

The configuration information may include any one of the following information.

Information indicating a radio resource used by the UE 100 to feed back the measurement result of the interference state Information used by the UE 100 to instruct a timing for measuring the interference state (for example, a measurement gap (Gap) set to measure the interference state by the UE 100)

Information indicating a threshold value used when the UE 100 determines the interference The UE 100 that has received the RRC connection reconfiguration message changes the configuration of the RRC connection with the PCell. Further, the UE 100 performs the configuration, on the basis of the configuration information included in the message. For example, the UE 100 performs, on the basis of the U-SCell add config., the configuration for utilizing the specific frequency band as the secondary carrier (U-SCell).

It is noted that the PCell may transmit the configuration information by an SIB.

In step S102, the PCell transmits a U-cell activation message (U-cell Activate) to the UE 100.

In step S103, the UE 100 that has received the U-cell activation message, starts monitoring a downlink to perform communication with the U-SCell set on the basis of the U-SCell add config. That is, the UE 100 activates the U-SCell, in response to reception of the U-cell activation message. Further, UE 100 activates (turns on) the radio transceiver 110B if the radio transceiver 110B for specific frequency band has not been activated.

It should be noted that if setting a timer (Deactivation timer) for ending the communication with the U-SCell, the UE 100 activates the timer simultaneously of the activation of the U-SCell. If the timer expires, the UE 100 deactivates the U-SCell (if a plurality of U-SCells are activated, the UE 100 deactivates the U-SCell corresponding to the timer). In this case, the UE 100 may turn the radio transceiver 110B OFF. Further, upon reception of the PDCCH indicating an uplink grant or a downlink assignment for communication with the U-SCell, the UE 100 restarts the timer. Alternatively, the timer may be set to the PCell.

The timer may be a deactivation timer for the existing SCell (sCellDeactivationTimer), and may be a deactivation timer dedicated to the U-SCell different from the sCellDeactivationTimer.

It is noted that, in response to reception of the configuration information in S101, the UE 100 may activate the U-SCell. The PCell may omit transmission of the U-cell activation message.

In step S104, the UE 100 measures the interference state, on the basis of the configuration information included in the RRC connection configuration message. As the measurement of the interference state, the UE 100 performs measurement on the interference applied to another device, rather than measurement on the interference received by the UE 100 itself. That is, the UE 100 performs measurement for determining whether or not the UE 100 itself may perform transmission by a predetermined channel.

The UE 100 starts a carrier sense to measure the interference state in the specific frequency band. Specifically, in order to search for a free channel in the specific frequency band, the UE 100 starts measuring interference power in the specific frequency band so as to monitor a surrounding communication situation. It is noted that if information that instructs the timing for measuring the interference state is included in the configuration information, the UE 100 measures the interference state at a timing instructed by the configuration information.

The UE 100 determines that in the specific frequency band, a channel (e.g., a band unit, a sub-band unit, or a resource unit) in which interference power equal to or more than a threshold value (or Interference over Thermal Noise (IoT)) is measured as a used channel, and determines that other channels are free channels (or vacant resources). Further, the UE 100 may measure a reception time of the interference power. The UE 100 may determine, if the reception time of the interference power is less than a threshold value, that the channel in which the interference power is measured is a free channel.

In the present embodiment, description proceeds with an assumption that the UE 100 determines that second and third channels are free channels, out of first to fourth channels configured by dividing the specific frequency band into four parts in a frequency direction (see FIG. 7).

In step S105, the UE 100 is capable of transmitting (i.e., notifying), to the PCell or the pSCell, a measurement report (Free channel/resource feedback) indicating the interference state in the specific frequency band. Therefore, the UE 100 transmits the measurement report by utilizing the general frequency band rather than the specific frequency band. The PCell or the pSCell acquires the measurement report by utilizing the general frequency band. Thus, the PCell or the pSCell, which does not receive the interference from another radio device performing communication in the specific frequency band, is capable of reliably receive the measurement report. Further, the UE 100, which does not apply the interference to the other radio device even if transmitting the measurement report, is capable of effectively utilizing the specific frequency band. If receiving the measurement report, the pSCell (SeNB) notifies the PCell (MeNB) of the measurement report.

It is noted that the measurement report according to the present embodiment differs from a CSI feedback in that the signal from the U-SCell is not subject to the measurement report and information indicating the free channel is reported.

In the present embodiment, the UE 100 transmits, as the measurement report, free channel information ({0,1,1,0}) indicating that second and third channels are free channels.

Alternatively, the UE 100 may transmit, as the measurement report, information indicating the interference power itself to the PCell. In this case, the UE 100 may transmit information indicating that the interference power is classified into Low, Mid, and High (e.g., {3,0,1,3}), for example.

It is noted that the measurement report may include information on a time of the interference power (e.g., an interference power reception time and a time ratio of the interference power).

In step S106, the U-SCell notifies the PCell of the measurement report indicating the interference state in the specific frequency band measured by the (eNB configured to manage) U-SCell. The PCell acquires the measurement reports from the U-SCell.

The U-SCell performs a carrier sense for measuring the interference state in the specific frequency band in much the same way as the UE 100 does. The U-SCell may regularly measure the interference state, and may start the measurement by using, as a trigger, an instruction from the PCell.

In the present embodiment, description proceeds with an assumption that the U-SCell has notified, as the measurement report, free channel information ({1,0,1,1}) indicating that first, third, and fourth channels are free channels.

In step S107, (a scheduling control device of) the PCell performs scheduling to allocate a time-frequency resource to the UE 100. Specifically, the PCell that has acquired the measurement report from the UE 100 and the measurement report from the U-SCell, performs, on the basis of the acquired measurement report, scheduling so that the UE 100 and the U-SCell do not receive nor apply, if performing communication in the specific frequency band, the interference. The PCell, which is capable of performing the scheduling, on the basis of both the measurement reports from the transmission side and the reception side, is capable of further reducing the generation of the interference in the specific frequency band. In the present embodiment, upon determination, on the basis of the measurement report, that the first, second, and fourth channels are the used channels and the third channel is the free channel, the PCell allocates the third channel as the time-frequency resource to the UE 100.

It is noted that if the UE 100 instructs the measurement on the interference state at a regular timing, the Pcell allocates the time-frequency resource so that the UE 100 does not perform cellular communication at the timing. That is, the PCell avoids the allocation of the time-frequency resource that overlaps the timing in the time direction. As a result, the UE 100 is capable of ensuring the measurement timing of the interference state, and thus, it is possible to avoid a situation where it is not possible to measure the interference state by the cellular communication.

Further, if the measurement report measured by another UE within the coverage of the Pcell has been already acquired, the PCell is capable of performing, on the basis of the measurement report, the scheduling in taking into account a radio state in the specific frequency band of a whole of the coverage of the PCell. Thus, it is possible to solve a hidden terminal problem.

It is noted that instead of from another UE within the coverage of the Pcell, the Pcell may acquire the measurement report from a radio device, the radio device being capable of measuring the interference state in the specific frequency band within the coverage of the Pcell (e.g., an eNB configured to manage the specific frequency band, a wireless LAN access point (AP), and an access controller (AC) that is a node configured to collectively manage a plurality of wireless LAN access points).

It is noted that the PCell is capable of continuously performing the scheduling, on the basis of the acquired measurement report.

In step S108, the PCell notifies the U-SCell of the resource allocation (Resource Allocation) in step S107. In the present embodiment, the resource allocation is information indicating the third channel ({0,0,1,0}).

In step S109, the PCell transmits to the UE 100 the resource allocation (Resource Allocation) in step S107, by utilizing the general frequency band rather than the specific frequency band. Specifically, the PCell transmits, to the UE 100, the resource allocation that is the information indicating the third channel ({0,0,1,0}) by the PDCCH in the general frequency band.

In step S110, the U-SCell transmits, on the basis of the resource allocation, the data to the UE 100 by utilizing the specific frequency band, and the UE 100 receives, on the basis of the resource allocation, the data from the U-SCell.

In step S111, the UE 100 performs the carrier sense in order to measure the interference state in the specific frequency band, in much the same way as in step S104. The UE 100 may regularly perform the carrier sense on the basis of the configuration information from the PCell, and may start the carrier sense if reception quality from the U-SCell is lower than a threshold value.

In the present embodiment, description proceeds with an assumption that the UE 100 that has performed the carrier sense has determined that the second and third channels are free channels.

In step S112, the UE 100 transmits (i.e., notifies), to the PCell or the pSCell, the measurement report in much the same way as in step S105. If receiving the measurement report, the pSCell (SeNB) notifies the PCell (MeNB) of the measurement report.

In step S113, in much the same way as in step S106, a USCell that has performed the carrier sense notifies the PCell of the measurement report. In the present embodiment, description proceeds with an assumption that the U-SCell has notified, as the measurement report, free channel information ({1,0,0,1}) indicating that the first and fourth channels are free channels.

In step S114, the PCell determines, on the basis of the measurement report acquired in each of steps S112 and S113, that the first to fourth channels are used channels and thus there is no free channel. If determining that there is no free channel, the Pcell stops the allocation of the time-frequency resource to UE 100. The interference occurs if the UE 100 performs the communication in the specific frequency band, and thus, by stopping the resource allocation, it is possible to restrain the interference to another radio device. As a result, it is possible to effectively utilize the specific frequency band.

It is noted that the PCell may start the communication, in which the general frequency band is used, with the UE 100. Alternatively, if the UE 100 was performing the communication by utilizing the general frequency band as well as the specific frequency band, the PCell may continue the communication, in which the general frequency band is utilized, with the UE 100.

In step S115, the PCell transmits a U cell end message (U-cell Deactivate) to the UE 100. The UE 100 that has received the U cell end message, ends the communication with the U-SCell. Specifically, the UE 100 ends transmission to the U-SCell (uplink transmission), and ends the downlink monitoring. Further, if not communicating with the U-SCell other than the U-SCell instructed by the U cell end message (if there is no activated U-SCell), the UE 100 may turn the radio transceiver 110B to OFF. The UE 100 is capable of holding a configuration regarding the U-SCell with which the communication was being performed.

It is noted that step S115 may be omitted.

In step S116, the UE 100 ends the carrier sense. The UE 100 may end the carrier sense in response to reception of the U cell end message. Alternatively, the UE 100 may end the carrier sense if not receiving the resource allocation from the Pcell.

(Modification 1-1)

Figure 8:
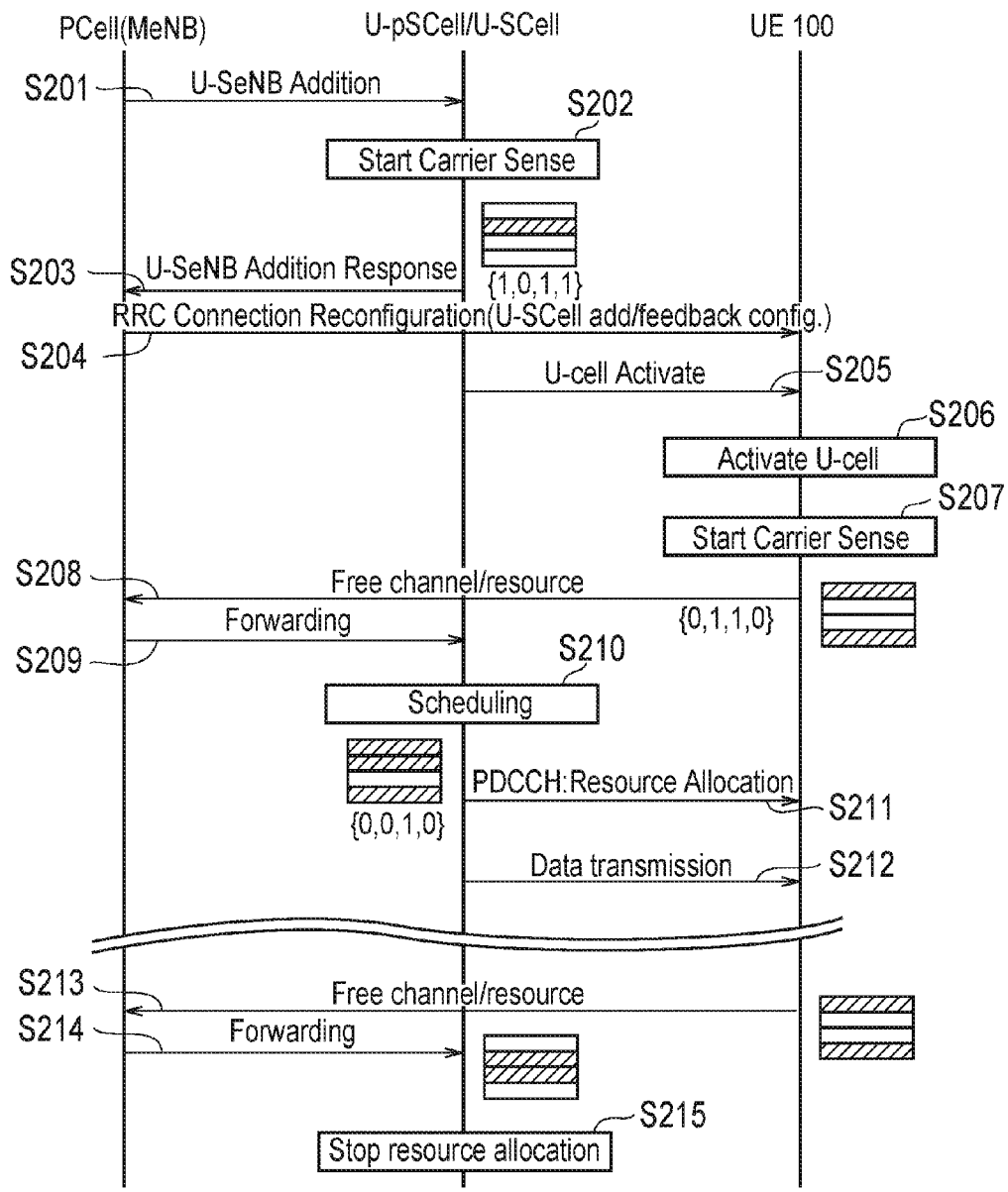
FIG. 8 is a sequence diagram for describing an operation according to a modification 1 of the first embodiment.

Next, an operation according to a modification 1 (modification 1-1) of the first embodiment will be described by using FIG. 8. FIG. 8 is a sequence diagram for describing the operation according to the modification 1 of the first embodiment. The modification 1 is the Standalone with LAA case. The notification between the MeNB (PCell) and the SeNB (U-SCell including U-pSCell) is performed via a backhaul (with or without wires) between the eNBs 200.

Description overlapping the above-described embodiment is omitted, where appropriate.

As illustrated in FIG. 8, in step S201, the Pcell transmits, to the eNB configured to manage a cell that may be the U-pSCell or the U-SCell, a U-SeNB addition message (U-SeNB Addition) for requesting addition of a cell of the specific frequency band in order to perform communication with the UE 100.

In step S202, the eNB that has received the U-SeNB addition message starts the carrier sense for measuring the interference state in the specific frequency band (see step S106). The eNB determines whether or not it is possible to add a cell of the eNB as the U-pSCell or the U-SCell (hereinafter, U-pSCell). If there is the free channel, on the basis of the measurement result, the eNB determines that it is possible to add, as the U-pSCell, a cell of the eNB for communication with the UE 100. In the present embodiment, description proceeds with an assumption that the eNB 200 has determined that it is possible to add, as the U-pSCell, a cell of the eNB.

In step S203, the eNB transmits, to the PCell, a U-SeNB addition response message (U-SeNB Addition Response) indicating whether or not it is possible to add, as the U-pSCell, a cell of the eNB.

In the present embodiment, in order to add a cell of the eNB as the U-pSCell, the eNB 200 transmits the U-SeNB addition response message. The U-SeNB addition response message includes information necessary to add a cell of the eNB as the U-pSCell.

Description proceeds while the operation of the eNB 200 is regarded as the operation of the U-pSCell, below.

Step S204 corresponds to step S101.

In step S205, the U-pSCell transmits the U-cell activation message to the UE 100 (see step S102). It is noted that U-cell activation message may be transmitted from the PCell.

Steps S206 to S208 correspond to steps S103 to S105.

In step S209, the PCell utilizes the general frequency band to transfer, via the backhaul, the measurement report received from the UE 100. Accordingly, the UE 100 notifies, by way of the PCell, the U-pSCell (SeNB) of the measurement report. By utilizing the general frequency band and the backhaul rather than the specific frequency band, it is possible to ensure that the measurement report is notified from the UE 100 to the U-pSCell without causing interference to the other radio device that perform communication in the specific frequency band.

In step S210, (a scheduling control device of) the U-pSCell performs scheduling to allocate the time-frequency resource to the UE 100 (see step S107). The U-pSCell allocates, if receiving, from the PCell, the information instructing a timing at which the UE 100 measures the interference state, the time-frequency resource so that the UE 100 does not perform the exchange at the timing.

It is noted that the U-pSCell may utilize the measurement result obtained in step S202, and may utilize the measurement result obtained as a result of performing the carrier sense after transmitting the U-cell activation message in S205, or after acquiring the measurement report of the UE 100 in S209.

In step S211, the U-pSCell or the U-SCell transmits, to the UE 100, the resource allocation (Resource Allocation) in step 210 by the PDCCH (see step S109).

Steps S212 and S213 correspond to steps S110 and S112.

In step S214, in much the same way as in step S209, the PCell utilizes the general frequency band to transfer, via the backhaul, the measurement report received from the UE 100. Accordingly, it is possible to restrain the interference to the other radio device.

Further, the U-pSCell starts the carrier sense in much the same way as in step S202. As a result, the U-pSCell acquires the measurement result indicating the interference state in the specific frequency band.

In step S215, if determining, on the basis of the measurement result obtained in step S214 and the measurement result of itself, that there is no free channel, the U-pSCell stops the allocation of the time-frequency resource to the UE 100 (see step S114).

(Modification 1-2)

Figure 9:
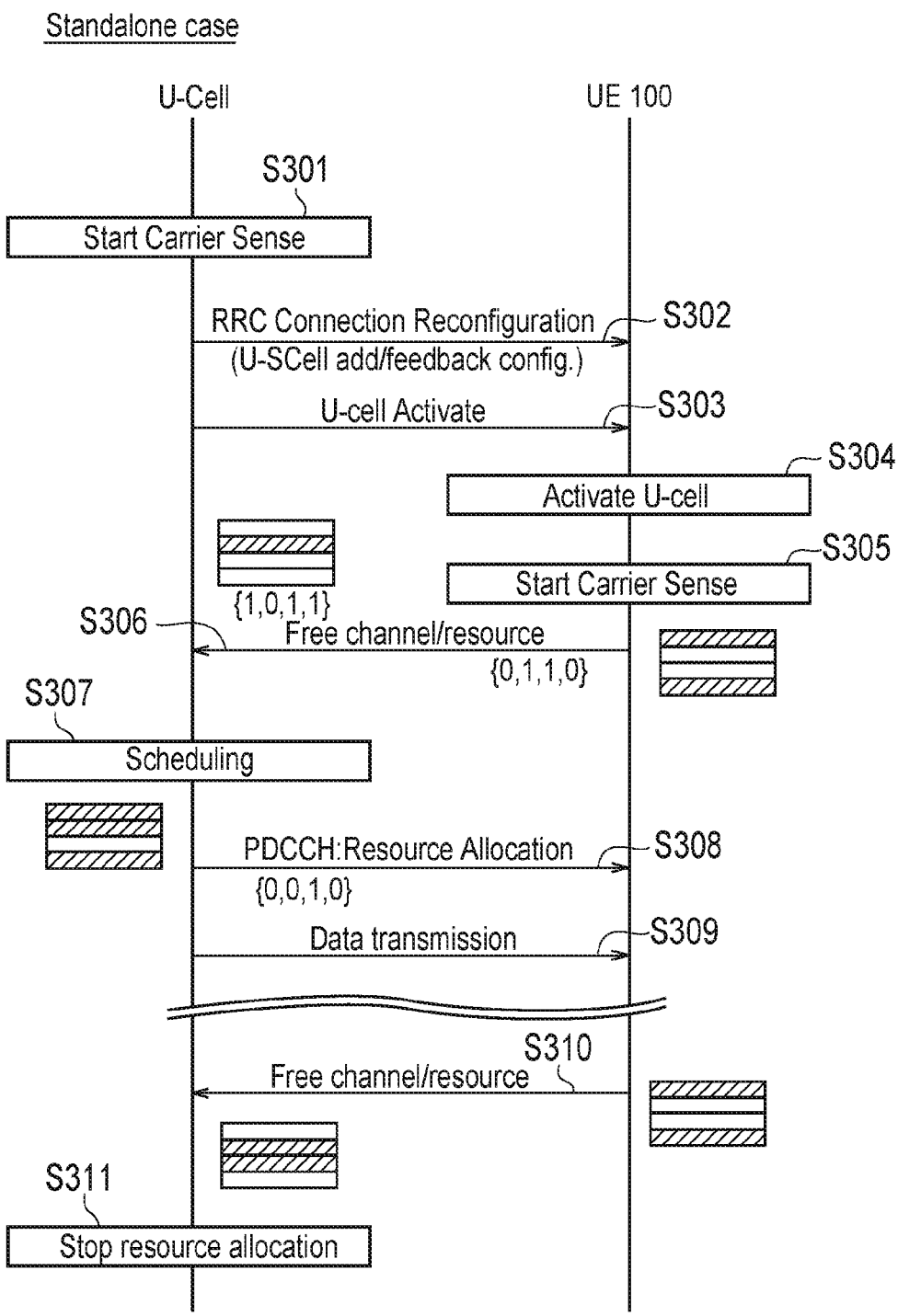
FIG. 9 is a sequence diagram for describing an operation according to a modification 2 of the first embodiment.

Next, an operation according to a modification 2 (modification 1-2) of the first embodiment will be described by using FIG. 9. FIG. 9 is a sequence diagram for describing the operation according to the modification 2 of the first embodiment. The modification 2 is the Standalone case. If the CA is utilized, below, the U-Cell includes at least any one of the U-SCell and the U-PCell. Description overlapping the above-described embodiment and modification 1 is omitted, where appropriate.

As illustrated in FIG. 9, in step S301, the U-Cell starts the carrier sense for measuring the interference state in the specific frequency band (see step S202).

In step S302, the U-Cell (U-PCell) transmits the RRC connection reconfiguration message to the UE 100 (see step S101). It is noted that if the U-Cell is the USCell, the RRC connection reconfiguration message is not transmitted from the PCell not shown.

Steps S303 to S305 correspond to steps S205 to S207. It is noted that in step S303, the U-PCell or the U-SCell is capable of transmitting the U-cell activation message.

In step S306, the UE 100 transmits (i.e., notifies) a measurement report (Free channel/resource feedback) to the U-Cell (U-PCell).

Steps S307 to S309 correspond to steps S210 to S212. It is noted that in step S308, the U-PCell or the U-SCell is capable of transmitting the resource allocation to the UE 100.

In step S310, the UE 100 transmits the measurement report to the U-Cell in much the same way as in step S306.

Step S311 corresponds to step S215.

Thus, even if it is not possible to utilize the general frequency band, when the scheduling is performed by using the measurement result indicating the interference state in the specific frequency band, the U-Cell is capable of effectively utilizing the specific frequency band.

[Second Embodiment]

Figure 10:
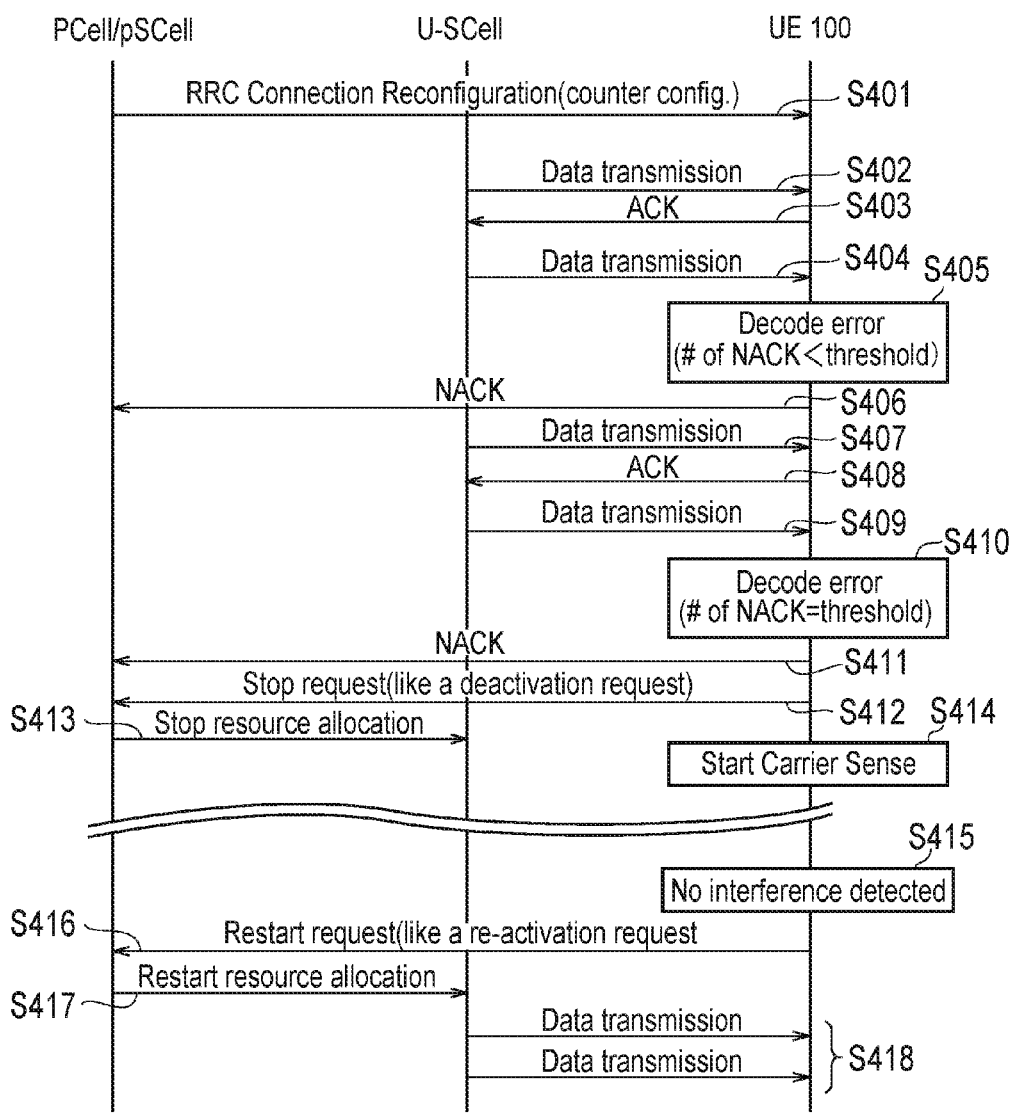
FIG. 10 is a sequence diagram for describing an operation according to a second embodiment.

Next, an operation according to a second embodiment will be described by using FIG. 10. FIG. 10 is a sequence diagram for describing the operation according to the second embodiment. Here, the LAA case will be described.

In the above-described first embodiment, description proceeds with a focus on the operation in which the specific frequency band is effectively utilized by performing the scheduling by using the measurement result indicating the interference state in the specific frequency band. In the second embodiment, description proceeds with a focus on an operation in which in order to effectively utilize the specific frequency band, the UE 100 stops the communication if receiving the interference in the specific frequency band and the UE 100 starts (restarts) the communication if stopping receiving the interference in the specific frequency band.

As illustrated in FIG. 10, in step S401, the Pcell transmits the RRC connection reconfiguration message (RRC Connection Reconfiguration) to the UE 100.

The RRC connection reconfiguration message includes counter configuration information (counter config.). The counter configuration information is configuration information to allow the UE 100 to measure the number of times in which reception (decoding) of data transmitted in the specific frequency band is failed. The counter configuration information includes information indicating a threshold value (hereinafter, "decoding failure threshold value") used for comparison with the number of times in which the data reception is failed.

In step S402, the U-SCell utilizes the specific frequency band to transmit the data to the UE 100.

In step S403, the UE 100 attempts to decode the data transmitted from the U-SCell. Here, description proceeds with an assumption that as a result of successfully decoding the data, the UE 100 has properly received the data by utilizing the specific frequency band.

The UE 100 transmits, to the U-SCell, an acknowledgment (ACK) indicating that the data has been properly received by utilizing the specific frequency band.

In step S404, the U-SCell utilizes, in much the same way as in step S402, the specific frequency band to transmit the data to the UE 100.

In step S405, decoding the data transmitted from the U-SCell is attempted. Here, description proceeds with an assumption that as a result of failing to decode the data, the UE 100 has not properly received the data by utilizing the specific frequency band.

In this case, the UE 100 compares the number of times in which decoding of the data transmitted in the specific frequency band is failed (or a NACK transmission count, described below) with a decoding failure threshold value. Description proceeds with an assumption that the number of times is less than the decoding failure threshold value.

In step S406, the UE 100 transmits a negative acknowledgment (NACK) indicating that the data has not been properly received by utilizing the specific frequency band, to the PCell or the pSCell rather than to the U-SCell from which the data has been transmitted. Thus, in the present embodiment, the UE 100 utilizes the specific frequency band to transmit the ACK, and utilizes the general frequency band to transmit the NACK. As a result, even if receiving the interference in the specific frequency band from another radio device, the UE 100 is capable of utilizing the general frequency band so as to reliably convey to the data transmission source that the data has not been properly received.

The PCell or the pSCell is capable of notifying the U-SCell of the NACK received from the UE 100. If the PCell and the U-SCell are managed by the different eNB 200, the PCell is capable of notifying, via the backhaul, the U-SCell of the NACK.

Thereafter, the UE 100 increments the number of times in which decoding of the data transmitted in the specific frequency band is failed (or the NACK transmission count).

In step S407, the U-SCell utilizes the specific frequency band to transmit (retransmit) the data to the UE 100. If receiving, from the PCell, a notification indicating that the NACK from the UE 100 has been received, the U-SCell retransmits the data to the UE 100. Alternatively, if not capable of receiving the ACK from the UE 100 within a predetermined time, the USCell may retransmit the data to the UE 100.

In step S408, the UE 100 transmits the ACK to the USCell in much the same way as in step S403.

In step S409, the U-SCell utilizes the specific frequency band to transmit the data to the UE 100.

In step S410, the UE 100 attempts to decode the data transmitted from the U-SCell in much the same way as in step S405. Here, description proceeds with an assumption that as a result of failing to decode the data, the UE 100 has not properly received the data by utilizing the specific frequency band and the NACK transmission count reaches the decoding failure threshold value. As a result, the UE 100 determines that the reception quality in the specific frequency band is lower than a threshold value.

In step S411, the UE 100 transmits the NACK to the PCell or the pSCell in much the same way as in step S406.

In step S412, the UE 100 transmits (i.e., notifies) to the PCell or the pSCell a stop request to request a stop of the communication in the specific frequency band (Stop request), in response to the NACK transmission count having reached the decoding failure threshold value. If the pSCell receives the stop request, the pSCell notifies the Pcell of the stop request. Thus, the UE 100 transmits the stop request by utilizing the general frequency band rather than the specific frequency band.

In the present embodiment, the stop request is information indicating that the reception quality is lower than a threshold value in the specific frequency band. As a result, even if receiving the interference in the specific frequency band from another radio device, the UE 100 is capable of utilizing the general frequency band so as to reliably convey the stop request to the scheduling control device (and/or the data transmission source).

The PCell stops, on the basis of the stop request, allocation to the UE 100 of the time-frequency resource in the specific frequency band.

It is noted that the stop request is similar to a deactivation request; however, differs in that the communication with the cell that is to be stopped is not completely ended (that is, the communication is temporarily stopped).

In step S413, the PCell or the U-SCell notifies, on the basis of the stop request from the UE 100, the U-SCells of a resource allocation stop message (Stop resource allocation) indicating that the allocation of the time-frequency resource to the UE 100 is stopped, and the U-SCell that has received a notification of the resource allocation stop message is capable of stopping the transmission (retransmission) to the UE 100.

In step S414, the UE 100 starts the carrier sense to measure the interference state in the specific frequency band. Here, the UE 100 start the carrier sense in accordance with the number of times in which the data has not been properly received by utilizing the specific frequency band (NACK transmission count). In the present embodiment, the UE 100 starts the carrier sense after the NACK transmission count reaches the decoding failure threshold value.

In step S415, the UE 100 detects, by the carrier sense, a free channel in which the interference signal is less than a threshold value, in the specific frequency band.

In step S416, if the UE 100 detects a free channel (for a predetermined period) (i.e., if the interference signal is equal to or less than the threshold value in at least a part of the specific frequency band), the UE 100 utilizes the general frequency band to transmit a restart request (Restart request) to start the communication in the specific frequency band, to the PCell or the pSCell. If the pSCell receives the restart request, the pSCell notifies the Pcell of the restart request. Thus, the UE 100 transmits the restart request by utilizing the general frequency band rather than the specific frequency band. The restart request may be information indicating that there is no interference.

It is noted that the restart request is similar to a re-activation request; however, differs from the re-activation request in that in the cell to be restarted, the communication is temporarily stopped. The PCell restarts, on the basis of the restart request, allocation to the UE 100 of the time-frequency resource in the specific frequency band.

In step S417, the PCell or the pSCell transmits, on the basis of the restart request from the UE 100, a resource allocation restart message (Restart resource allocation) indicating restart of the allocation of the time-frequency resource. The PCell or the pSCell may include the time-frequency resource in the specific frequency band allocated to the UE 100, into the resource allocation stop message.

In step S418, the U-SCell that has received the resource allocation restart message restarts the transmission of the data to the UE 100 in which the specific frequency band is utilized.

(Modification 2-1)

Figure 11:
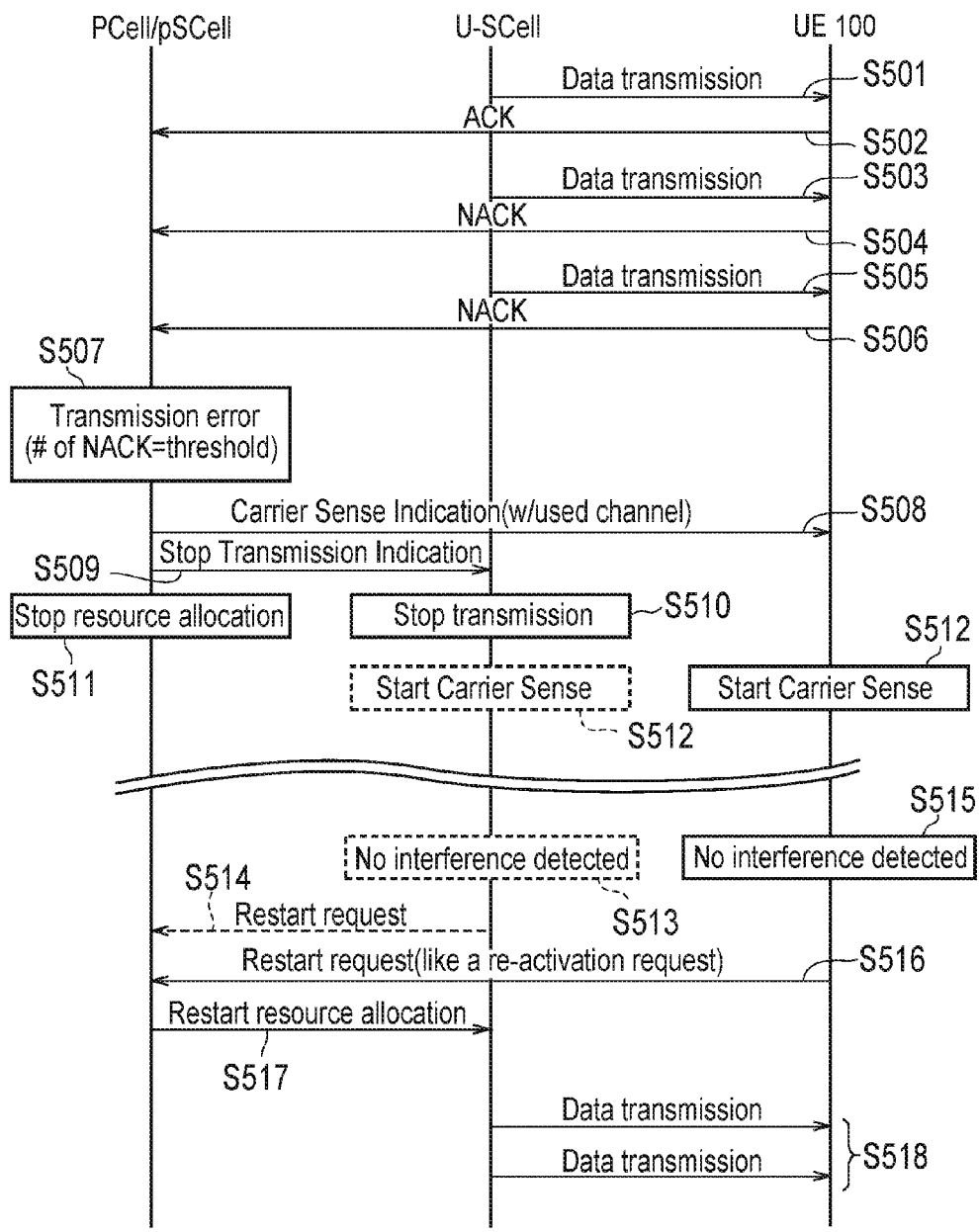
FIG. 11 is a sequence diagram for describing an operation according to a modification 1 of the second embodiment.

Next, an operation according to a modification 1 (modification 2-1) of the second embodiment will be described by using FIG. 11. FIG. 11 is a sequence diagram for describing the operation according to the modification 1 of the second embodiment. The present modification corresponds to the LAA case. Description overlapping each of the above-described embodiments is omitted, where appropriate.

In the above-described second embodiment, the UE 100 determines that the reception quality in the specific frequency band is lower than the threshold value. In the present modification, the U-SCell determines that the reception quality of the UE 100 in the specific frequency band is lower than the threshold value.

In step S501, the U-SCell utilizes the specific frequency band to transmit the data to the UE 100. Here, description proceeds with an assumption that the UE 100 has successfully decoded the data transmitted from the U-SCell.

In step S502, the UE 100 transmits, to the PCell or the pSCell, the acknowledgment (ACK) indicating that the data has not properly received by utilizing the specific frequency band. In the present modification, the UE 100 transmits, to the PCell or the pSCell, not only the NACK but also the ACK. The pSCell may notify the PCell of the ACK/NACK received from the UE 100.

In step S503, the U-SCell utilizes, in much the same way as in step S501, the specific frequency band to transmit the data to the UE 100. Here, description proceeds with an assumption that the UE 100 has failed to decode the data transmitted from the U-SCell.

In step S504, the UE 100 transmits, to the PCell or the pSCell, the negative acknowledgment (NACK) indicating the it was not possible to have properly received the data by utilizing the specific frequency band (see step S406). It is noted that the PCell or the pSCell counts a NACK reception count, and compares the reception count with a threshold value. Here, description proceeds with an assumption that the reception count is less than the threshold value.

Steps S505 and S506 correspond to steps S503 and S504.

In step S507, the PCell or the pSCell determines, if the NACK reception count has reached the threshold value, that the reception quality of the UE 100 in the specific frequency band is lower than the threshold value. In this case, the PCell executes the processes of steps S509 and S511. It is noted that if the pSCell makes the determination, an indication that the reception quality of the UE 100 in the specific frequency band is lower than the threshold value may be notified to the PCell.

It is noted that the threshold value in this case may be the same as the decoding failure threshold value included in the counter configuration information in step S401.

In step S508, the PCell or the pSCell transmits, to the UE 100, a measurement instruction (Carrier Sense Indication) of the interference state in the specific frequency band by utilizing the general frequency band. Thus, the UE 100, which is not capable of reception by utilizing the specific frequency band, is capable of receiving the measurement instruction. The measurement instruction may include information indicating a channel (frequency band) used for the resource allocation to the UE 100.

It is noted that in order to grasp a radio condition in the specific frequency band of a whole of the coverage of the PCell, the PCell or the pSCell may transmit the measurement instruction not only to the UE 100 but also to another UE in the coverage of the PCell.

In step S509, the PCell or the pSCell notifies the U-SCell of a transmission stop instruction (Stop Transmission Indication) that is an instruction to ensure that the data transmission (retransmission) to the UE 100 is stopped.

In step S510, the U-SCell stops, on the basis of the transmission stop instruction, the transmission (retransmission) to the UE 100.

In step S511, the PCell stops, in accordance with the reception state of the NACK from the UE, the allocation of the time-frequency resource in the specific frequency band to the UE 100. Specifically, the PCell stops the resource allocation to the UE 100 after the NACK reception count has reached the threshold value.

In step S512, the UE 100 starts, on the basis of the measurement instruction of step S508, the carrier sense for measuring the interference state in the specific frequency band. If the measurement instruction of step S508 includes information indicating a channel (frequency band) used for the resource allocation to the UE 100, the measurement of the interference state may be performed on the channel.

It is noted that the U-SCell may start the carrier sense after stopping the transmission (retransmission) to the UE 100.

In step S513, if the U-SCell detects a free channel (for a predetermined period), the U-SCell may notify, in step S514, the PCell of a restart request (Restart request) to start the communication in the specific frequency band.

Steps S515 to S518 correspond to steps S415 to S418.

It is noted that in step S517, if receiving the restart request not only from the UE 100 but also from the U-SCell, the PCell may notify the U-SCell of the resource allocation restart message.

(Modification 2-2)

Figure 12:
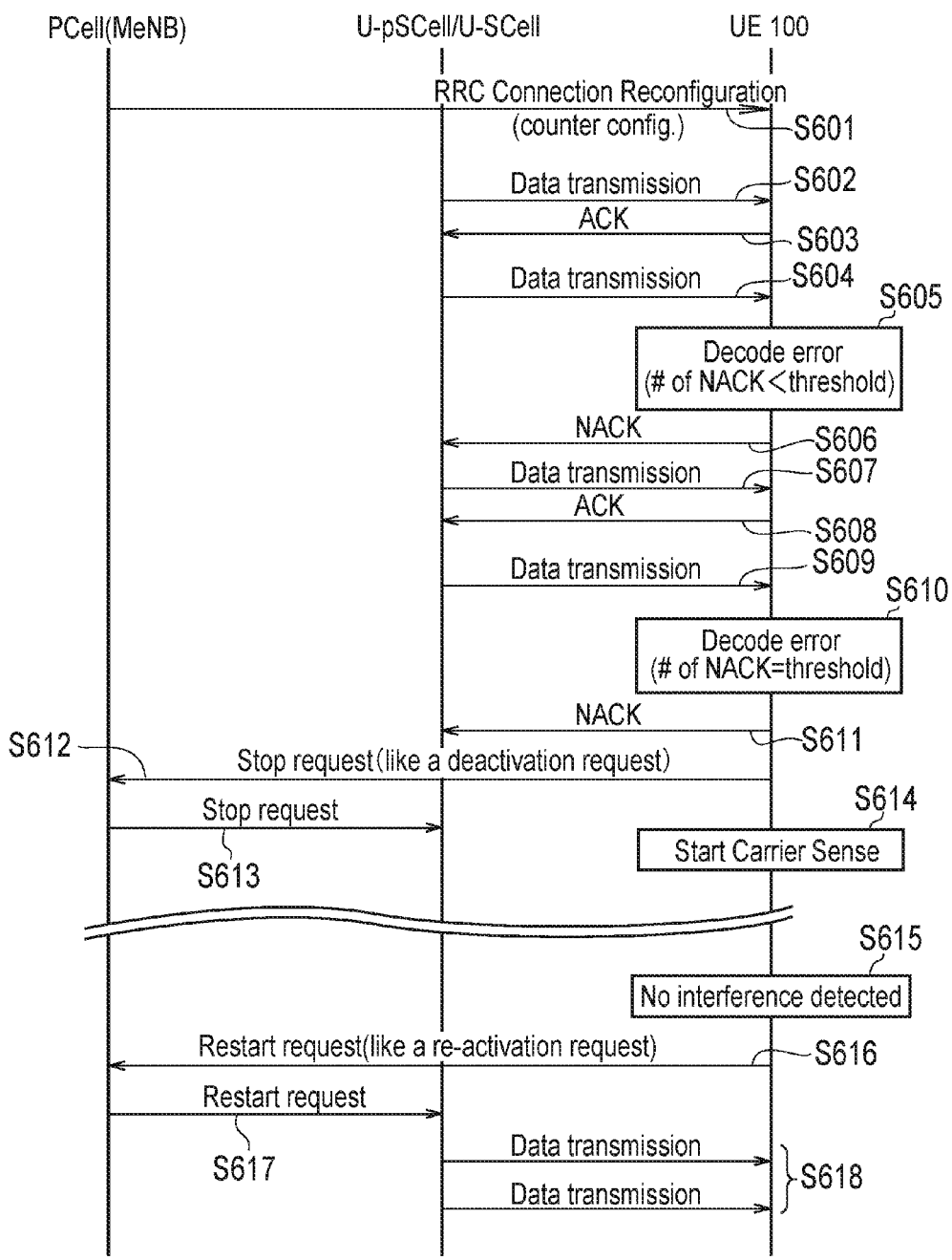
FIG. 12 is a sequence diagram for describing an operation according to a modification 2 of the second embodiment.

Next, an operation according to a modification 2 (modification 2-2) of the second embodiment will be described by using FIG. 12. FIG. 12 is a sequence diagram for describing the operation according to the modification 2 of the second embodiment. The present modification corresponds to the Standalone with LAA case. Description overlapping each of the above-described embodiments is omitted, where appropriate.

The present modification presents, in much the same way as in the above-described second embodiment, a case where the UE 100 determines that the reception quality in the specific frequency band is lower than the threshold value.

As illustrated in FIG. 12, in step S601, the PCell (MeNB) transmits, to the UE 100, an RRC connection reconfiguration message (RRC Connection Reconfiguration) (see step S401).

Steps S602 to S605 correspond to steps S402 to S405.

In step S606, the UE 100 transmits the NACK to the U-pSCell.

In step S607, the U-pSCell (and the U-SCell) transmits (retransmits) the data to the UE 100, in accordance with the NACK.

Steps S608 to S610 correspond to steps S408 to S410.

In step S611, the UE 100 transmits, in much the same way as in step S606, the NACK to the U-pSCell.

In step S612, the UE 100 transmits (notifies), in accordance with the NACK transmission count having reached the decoding failure threshold value, the stop request (Stop request) to the PCell rather than to the U-pSCell to which the ACK/NACK is transmitted.

In step S613, the PCell that has received the stop request transfers the received stop request, via the backhaul, to the U-pSCell or the U-SCell. As a result, the UE 100 notifies, by way of the PCell, the U-pSCell or the U-SCell of the stop request. By utilizing the general frequency band and the backhaul rather than the specific frequency band, it is possible to ensure that the stop request is notified from the UE 100 to the U-pSCell or the U-SCell without causing interference to another radio device that performs communication in the specific frequency band.

Steps S614 to S616 correspond to steps S414 to S416.

In step S617, the PCell that has received the restart request transfers the received restart request, via the backhaul, to the U-pSCell or the U-SCell. As a result, the UE 100 notifies, by way of the PCell, the U-pSCell or the U-SCell of the stop request. By utilizing the general frequency band and the backhaul rather than the specific frequency band, it is possible to ensure that the restart request is notified from the UE 100 to the U-pSCell or the U-SCell without causing interference to another radio device that performs communication in the specific frequency band.

Step S618 corresponds to step S418.

(Modification 2-3)

Figure 13:
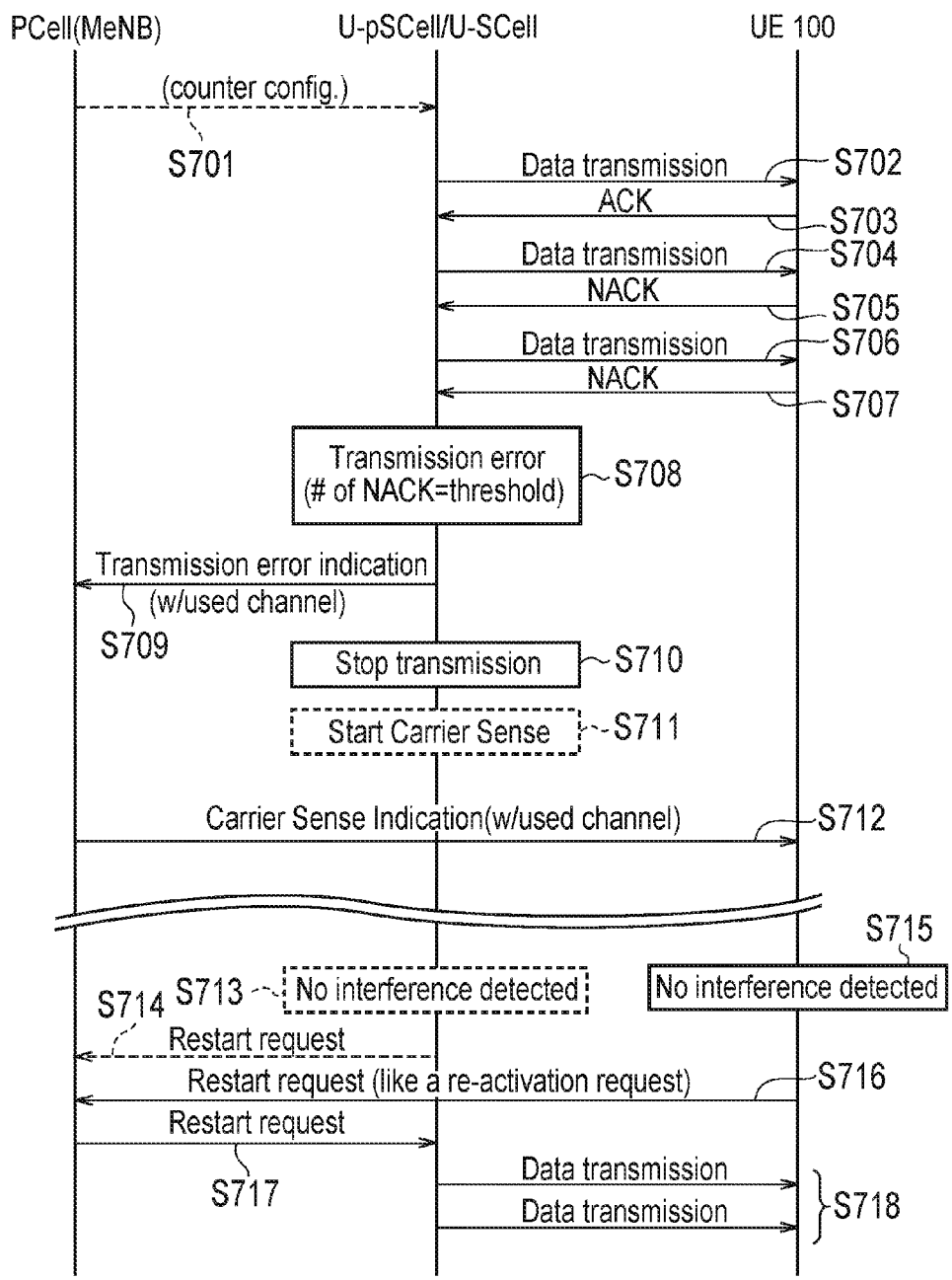
FIG. 13 is a sequence diagram for describing an operation according to a modification 3 of the second embodiment.

Next, an operation according to a modification 3 (modification 2-3) of the second embodiment will be described by using FIG. 13. FIG. 13 is a sequence diagram for describing the operation according to the modification 3 of the second embodiment. The present modification corresponds to the Standalone with LAA case. Description overlapping each of the above-described embodiments is omitted, where appropriate.

In the modification 1 of the above-described second embodiment, the PCell (or the pSCell) determines that the reception quality of the UE 100 in the specific frequency band is lower than the threshold value. In the present modification, the U-pSCell or the U-SCell determines that the reception quality of the UE 100 in the specific frequency band is lower than the threshold value.

In step S701, the PCell may transmit the counter configuration information to the U-pSCell or the U-SCell (see step S401). It is noted that step S701 may be omitted. In this case, the U-pSCell may use a preset threshold value (decoding failure threshold value).

Steps S702 to S707 correspond to steps S602 to S604, S606, S609, and S611.

In step S708, the U-pSCell determines, if the NACK reception count has reached the threshold value, that the reception quality of the UE 100 in the specific frequency band is lower than the threshold value (see step S507). In this case, the U-pSCell performs processes of steps S709 and S710.

Further, (a scheduling control device of) the U-pSCell stops the allocation to the UE 100 of the time-frequency resource in the specific frequency band.

It is noted that the U-pSCell may replace the number of times in which it is not possible to receive the ACK within a predetermined time by the number of times in which the NACK is received.

In step S709, the U-pSCell (or the U-SCell) notifies, via the backhaul, the PCell of a transmission error instruction, as the information indicating that the reception quality of the UE 100 in the specific frequency band is lower than a threshold value. The transmission error instruction may include information indicating a channel (frequency band) used for the resource allocation to the UE 100.

Steps S710 and S711 correspond to (the operation of the U-SCell of) steps S510 and S512.

Step S712 corresponds to step S508. Here, the PCell transmits, on the basis of the transmission error instruction from the U-pSCell (or the U-SCell), the measurement instruction to the UE 100 by utilizing the general frequency band. Therefore, the transmission error instruction is used as a trigger for causing the UE 100 to start the carrier sense. The UE 100 is capable of reliably receiving the measurement instruction because of routing the general frequency band, even if the interference occurs in the specific frequency band.

Steps S713 to S718 correspond to steps S513 to S518.

(Modification 2-4)

Figure 14:
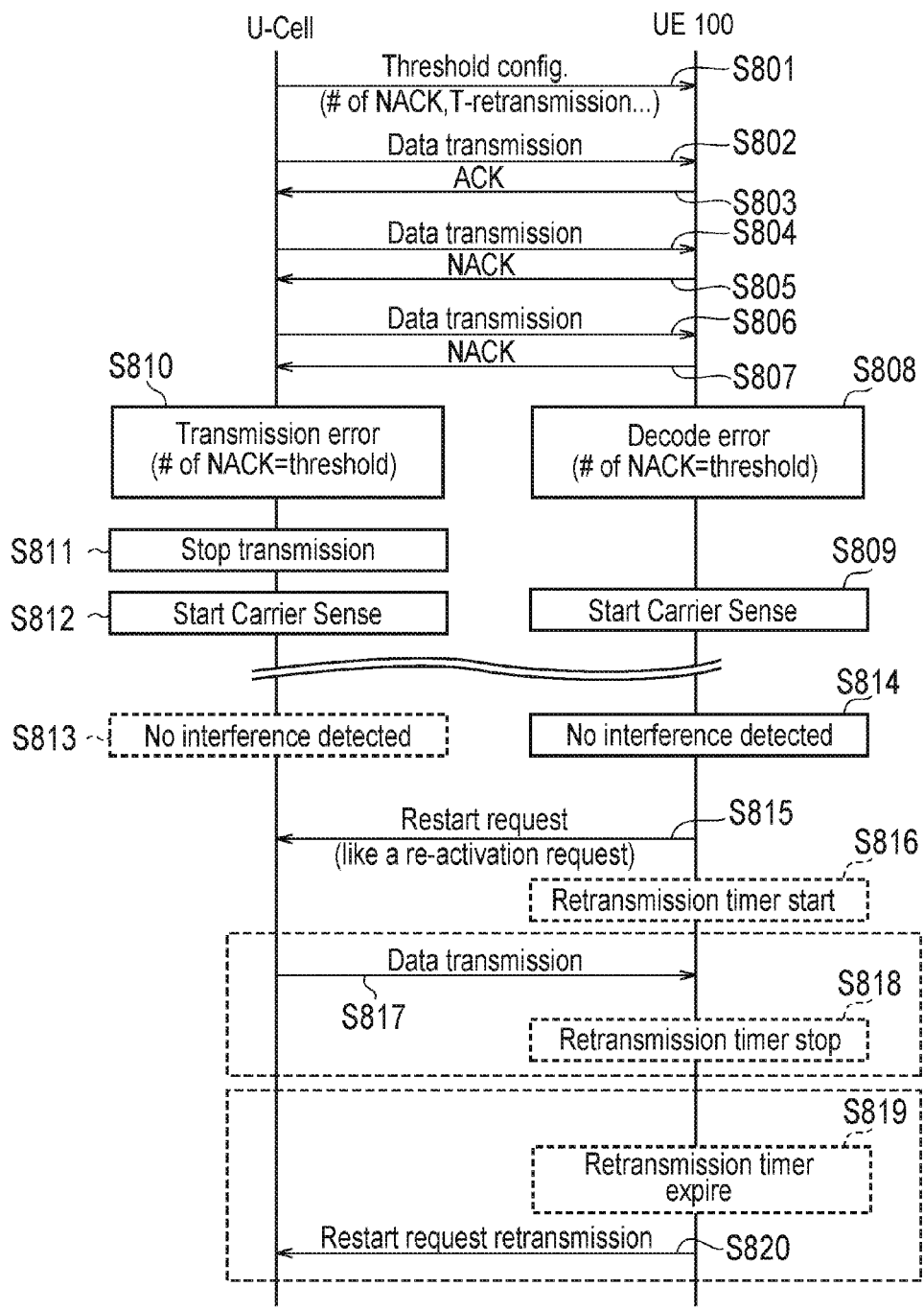
FIG. 14 is a sequence diagram for describing an operation according to a modification 4 of the second embodiment.

Next, an operation according to a modification 4 (modification 2-4) of the second embodiment will be described by using FIG. 14. FIG. 14 is a sequence diagram for describing the operation according to the modification 4 of the second embodiment. The present modification corresponds to the Standalone case. Description overlapping each of the above-described embodiments is omitted, where appropriate.

In the present modification, each of the U-Cell and the UE 100 determines that the reception quality of the UE 100 in the specific frequency band is lower than the threshold value.

As illustrated in FIG. 14, in step S801, the U-Cell (the U-PCell or the U-SCell) transmits threshold value configuration information (Threshold config.) to the UE 100. The threshold value configuration information may include the following information.

Information indicating the decoding failure threshold value (see step S401)

Information indicating a retransmission timer (T-retransmission)

Information indicating the retransmission count (N-retransmission)

The UE 100 sets information included in the threshold value configuration information. When the threshold value configuration information includes the information indicating the decoding failure threshold value, the U-Cell and the UE 100 are capable of sharing the decoding failure threshold value.

Step S802 to step S807 correspond to step S702 to step S707. It is noted that the U-Cell (the U-PCell or the U-SCell) counts the NACK reception count (or an ACK reception failure count), and each of the UEs 100 counts the NACK transmission count. The U-Cell and the UE 100 compare the counted count with the decoding failure threshold value.

Steps S808 and S809 correspond to steps S410 and S414. Steps S810 to S813 correspond to steps S708, S710, S711, and S713. Steps S814 and S815 correspond to steps S415 and S416.

In step S816, if the UE 100 sets a retransmission timer, the retransmission timer is started on the basis of transmission of the retransmission request of step S815. It is noted that the retransmission timer may be started by using, as a trigger, the transmission of the retransmission request by using the specific frequency band without utilizing the general frequency band. This is due to the fact that the specific frequency band is available without a license, and as compared with the general frequency band, it is highly likely that the U-Cell is not capable of receiving the retransmission request.

In step S817, the U-Cell that has received the retransmission request of step S815 restarts the transmission of the data to the UE 100 that has utilized the specific frequency bands. The U-Cell may restart the transmission of the data to the UE 100, if detecting, in S813, a free channel (for a predetermined period), in addition to the retransmission request from the UE 100.

In step S818, if the retransmission timer has been started, the UE 100 stops the retransmission timer in response to the reception of the data from the UCell.

On the other hand, in step S819, if the retransmission timer expires before receiving the data from the U-Cell, in step S820, the UE 100 retransmits the retransmission request. Then, the retransmission timer may be started. The UE 100, which sets the retransmission count, ends the retransmission of the retransmission request if it is not possible to receive the data from the U-Cell even after the retransmission count is exceeded.

[Other Embodiments]

In each of the above-described embodiments, an eNB 200 configured to manage the general frequency band and an eNB 200 configured to manage the specific frequency band, may be the same or different. Further, in the above embodiments, if the eNB 200 configured to manage the general frequency band and the eNB 200 configured to manage the specific frequency band are different, it is possible to use an X1 interface or an S1 interface for exchange of a signal between a cell in which the general frequency band is utilized (e.g., the PCell) and a cell in which the specific frequency band is utilized (e.g., the U-Scell). Further, the backhaul may be with or without wires.

Further, in each of the above-described embodiments, the configuration information transmitted by the PCell to the UE 100 may include the following information.

Special cell information indicating a special cell in the specific frequency band Period information indicating a period during which the UE 100 measures the interference state The UE 100 is capable of determining that it is necessary to measure the interference state or determining to perform communication by using a WLAN link, in response to the reception of the special cell information.

The UE 100 does not fail to measure the interference state within a period (once) indicated by the period information. The UE 100 may measure the interference state in a period indicated by the period information.

In the above-described second embodiment, if a split bearer has been established, the MeNB (PCell) may determine whether or not to transfer the data of the UE 100 to the SeNB on the basis of the measurement report from the UE 100 and the measurement report from the SeNB (U-pSCell) after receiving the measurement report from the UE 100 in step S208. If there is a free channel, the PCell may start the transfer of the data of the UE 100 to the U-SCell. In this case, if determining on the basis of the measurement report from the UE 100 in S213 that there is no free channel, the MeNB may stop the transfer of the data of the UE 100 to the SeNB.

It is noted that in the split-bearer, in the DC, in order to use the resources of both the MeNB and the SeNB, a radio protocol of the bearer is located in both the MeNB and the SeNB. In split bearer, a split is observed in the MeNB 200-1 between the UE 100 and the P-GW, one of the splits (split bearer) is terminated in the UE 100 after passing through the SeNB 200-2, and the other split (split bearer) is terminated in the UE 100 without passing through the SeNB 200-2.

In the above-described second and third embodiments, the UE 100 transmits, in response to the NACK transmission count having reached the decoding failure threshold value, the stop request to the PCell or the pSCell; however, this is not limiting. The UE 100 may transmit the stop request if the data decoding failure count reaches the threshold value (decoding failure threshold value) in spite of the NACK transmission count.

In the above-described second and third embodiments, the UE 100 transmits the stop request to the PCell or the pSCell; however, this is not limiting. The UE 100 may transmit, instead of the stop request, a notification indicating that the data decoding failure count reaches an upper limit value to the PCell or the pSCell.

Further, in each of the above-described embodiments, instead of the eNB, e.g., an RRH base station (Remote Radio Head) may manage the specific frequency band and/or the general frequency band. In this case, instead of the backhaul, a fronthaul that connects an RRH and a BBH (Base Band Unit) may be used to notify the information to another RRH.

Further, the eNB configured to manage the specific frequency band may be collocated with the eNB configured to manage the general frequency band (a macro cell or a small cell), and may be collocated with a wireless LAN access point.

Further, in each of the above-described embodiments, the UE 100 may transmit the ACK/NACK by utilizing the specific frequency band if a data reception state in which the specific frequency band is utilized is equal to or greater than a threshold value, and may transmit the ACK/NACK by utilizing the general frequency band if the reception state is less than the threshold value. Alternatively, the UE 100 may utilize both the specific frequency band and the general frequency band to transmit the ACK/NACK.

In each of the above-described embodiments, in the Standalone with LAA case, the UE 100 has received the data from the U-pSCell and the U-SCell; however, this is not limiting. The UE 100 may receive the data from the U-pS-Cell only. Alternatively, the UE 100 may receive the data from a cell (U-PCell) in which the specific frequency band is managed by the MeNB. In this case, the MeNB manages the PCell and the U-PCell.

Further, in each of the above-described embodiments, the Standalone case may be a case where the specific frequency band in the DC may be utilized as the cell (U-PCell) managed by the MeNB and the cell (U-pSCell, U-SCell) managed by the SeNB.

In the above-described embodiments, although the LTE system is described as an example of the mobile communication system, it is not limited to the LTE system, and the present application may be applied to a system other than the LTE system.

INDUSTRIAL APPLICABILITY

As described above, the mobile communication system, the user terminal, the base station, the processor, and the communication control method according to the present embodiment are useful in the mobile communication field because it is possible to effectively utilize a specific frequency band.

The invention claimed is:

1. A user terminal configured to communicate by using an unlicensed frequency band, comprising:
a receiver; and
a controller; wherein
the receiver is configured to receive, from a base station, a message including first information and second information,
the first information is information regarding to a configuration for reporting a power measured by the user terminal in the unlicensed frequency band,
the first information includes period information indicating a period of a measurement in the unlicensed frequency band,
the second information is information regarding to a configuration of carrier aggregation, and
the controller is configured to:
  periodically measure the power in the unlicensed frequency band according to the period information;
  report to the base station on information classified according to the measured power as information indicating the measured power, on a basis of the first information;
  perform a configuration for using the unlicensed frequency band as a secondary carrier in the carrier aggregation, on a basis of the second information; and
  communicate a communication with the base station by using the secondary carrier, and
the controller is configured:
  to perform a control to start the communication of the unlicensed frequency band, in response to a reception of third information indicating that the communication of the unlicensed frequency band is allowed, wherein the third information differs from the first information and the second information; and
  not to perform the control until the reception of the third information even though the receiver receives the message including the first information and the second information.

2. A processor for controlling a user terminal configured to communicate by using an unlicensed frequency band, the processor configured to:
receive a message including first information and second information,
the first information is information regarding to a configuration for reporting a power measured by the user terminal in the unlicensed frequency band,
the first information includes period information indicating a period of a measurement in the unlicensed band,
the second information is information regarding to a configuration of carrier aggregation, and
the processor is configured to:
  periodically measure the power in the unlicensed frequency band according to the period information;
  report to a base station on information classified according to the measured power as information indicating the measured power, on a basis of the first information;
  perform a configuration for using the unlicensed frequency band as a secondary carrier in the carrier aggregation, on a basis of the second information; and
  communicate a communication with the base station by using the secondary carrier,
the processor is further configured:
  to preform a control to start the communication of the unlicensed frequency band, in response to a reception of third information that the communication of the unlicensed frequency band is allowed, wherein the third information differs from the first information and the second information; and not to preform the control until the reception of the third information even though the receiver receives the message including the first information and the second information.

\* \* \* \* \*